March 29, 1960 L. E. FOGARTY 2,930,144
GROUNDED AIRCRAFT TRAINER
Filed July 6, 1954 4 Sheets-Sheet 1

LAURENCE E. FOGARTY
INVENTOR

BY
ATTORNEY

March 29, 1960

L. E. FOGARTY 2,930,144

GROUNDED AIRCRAFT TRAINER

Filed July 6, 1954

LAURENCE E. FOGARTY
INVENTOR

BY
ATTORNEY

March 29, 1960  L. E. FOGARTY  2,930,144
GROUNDED AIRCRAFT TRAINER
Filed July 6, 1954  4 Sheets-Sheet 3

LAURENCE E. FOGARTY
INVENTOR

BY
ATTORNEY

March 29, 1960

L. E. FOGARTY 2,930,144

GROUNDED AIRCRAFT TRAINER

Filed July 6, 1954

LAURENCE E. FOGARTY
INVENTOR

BY
ATTORNEY

United States Patent Office 2,930,144
Patented Mar. 29, 1960

2,930,144

GROUNDED AIRCRAFT TRAINER

Laurence E. Fogarty, Binghamton, N.Y., assignor to General Precision, Inc., a corporation of Delaware Application July 6, 1954, Serial No. 441,570

19 Claims. (Cl. 35—12)

This invention relates to an aircraft trainer in which the operation of controls similar to those of a typical modern aircraft by a student causes operation of instruments and indicators on the student and instructor's panels to simulate the instrument operations of an actual aircraft in flight, whereby the pilot of a modern aircraft may be given ground training to insure efficient aircraft operation under actual flying conditions in a regular modern aircraft. More specifically, this invention relates to method and means by which typical modern aircraft may be more realistically simulated. Since modern day aircraft are costly to build, to fly and to maintain, and the use of such aircraft for extended training periods of personnel unacquainted with the type aircraft is both costly and hazardous, the use of grounded trainers to give extensive preliminary training has become common. As will be apparent, the value of such preliminary training in grounded aircraft trainers depends largely upon the degree of realism which the student is subjected to while he "flies" the grounded aircraft trainer.

A principal shortcoming of many contemporary flight trainers is that they are entirely stationary, resulting in a lack of "feel." Since pilot familiarity with a particular model aircraft is based upon the physical forces imparted to the pilot's body during flight as well as instrument indications observed during flight, it is desirable to provide as completely as is economically feasible, the sensations of actual flight in a grounded aircraft trainer.

The human body is most sensitive to pressure or forces, rather than velocities or position. Pressures and forces imparted to the pilot's body during flight are directly proportional to aircraft accelerations. In order to duplicate in a trainer exactly the forces acting upon the pilot in flight, it would be necessary to duplicate the linear and angular accelerations of the aircraft. This, of course, would require that the trainer follow exactly the same path as the aircraft, which is impossible in a grounded trainer. It has been found, however, that aircraft pilots are most sensitive to changes in aircraft attitude and direction during the first instant such a change occurs, and that a continued rotation or translation may not be noticed by the pilot after his body has been subjected to the initial impulse caused by a change in aircraft motion. Though it is desirable from the standpoint of accurate simulation that simulated acceleration forces be of the same magnitude as those forces experienced by a pilot in an actual aircraft, duplication in magnitude is not essential. It therefore becomes feasible to provide limited cockpit movement in a grounded aircraft trainer so that accelerations are felt by the student-pilot. In order that the trainer remain in place within the confines of the room or building wherein it may be situated, it is necessary that the mean velocities of the trainer be zero. It is also desirable in the interest of simplifying wiring and cables connected from computer cabinets and instructor stations to the trainer cockpit, that motion of the cockpit be limited as much as possible. The mean velocity of the trainer may be made zero by combining with the acceleration movements, other movements of opposite sense which will not be readily felt by the student-pilot.

It is therefore an object of the present invention to provide a grounded aircraft trainer in which the student's body is subjected to forces similar to those experienced by a pilot during actual flight.

It is also an object of the invention to provide a method of simulating the acceleration forces of actual motion in stationary apparatus.

It is another object of the invention to provide grounded training or simulating apparatus having limited movement capable of simulating the acceleration forces of a vehicle capable of unlimited movement. Although the invention is applicable to numerous vehicles, the principles of the invention are particularly applicable to grounded flight training apparatus.

Other objects of the invention will in part be obvious and will in part appear hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 1:
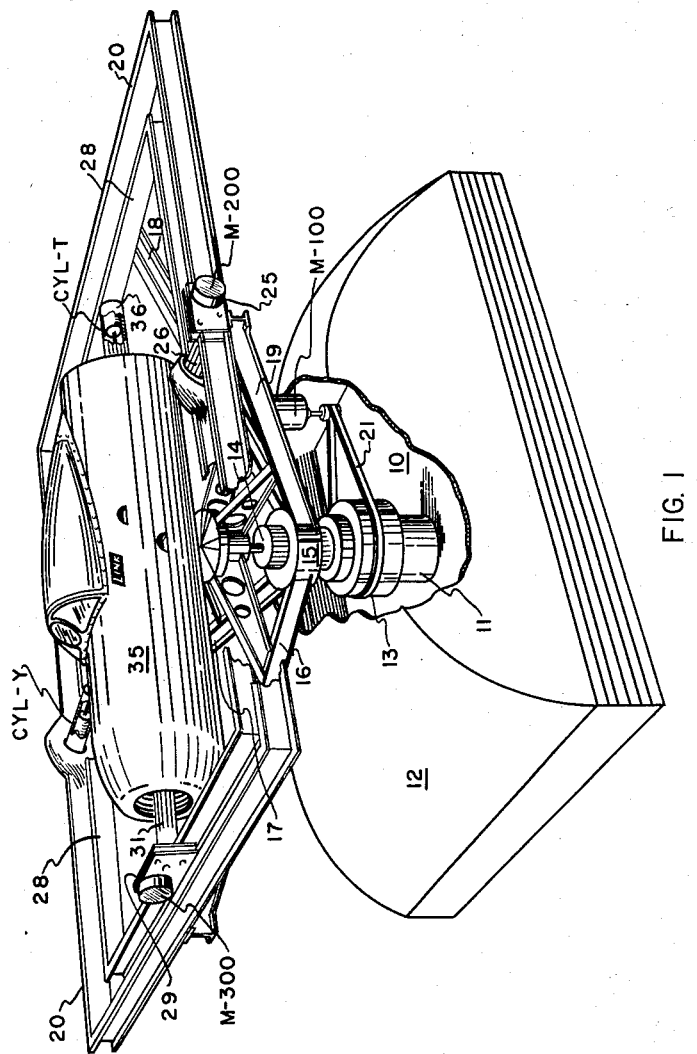
Figure 1 is a perspective view of an exemplary mechanical arrangement which may be utilized in practising the invention.

Since it is desirable that the mean velocities of a grounded aircraft trainer be zero, it is therefore necessary to provide motion signals for moving the trainer in simulation of actual flight and also to provide false signals which will cause the mean velocities of the trainer to be zero without destroying the essential character of the motion signals. Conventional grounded trainers are well-known in which electrical signals are derived commensurate with simulated aircraft forces, velocities and positions from flight system computers. Such signals are commonly produced by servomechanisms positioned in accordance with flight quantities and by integrating circuits such as the well-known Miller integrator shown in vol. 20, pp. 114–118 and vol. 21, pp. 79–83 M.I.T. Radiation Laboratory Series, McGraw-Hill, N.Y. Such flight signals may be utilized in the present invention to operate various servomechanisms to position the trainer cockpit. It is then necessary to add a second set of false signals which will force the mean velocity or displacement of the cockpit to be zero.

Denoting the flight quantity to be simulated by X, using subscript "s" for simulated quantities used to move the trainer and the subscript "a" for simulated aircraft quantities from conventional flight system computers, the equation for the simulated quantity may be:

$$k_1 X_s = X_a - k_2 \int_0^t X_s dt \qquad (1)$$

Differentiating Equation 1 with respect to time:

$$k_1 \dot{X}_s = \dot{X}_a - k_2 X_s \qquad (2)$$

Differentiating Equation 2 with respect to time:

$$k_1 \ddot{X}_s = \ddot{X}_a - k_2 \dot{X}_s \qquad (3)$$

Since the left-hand term of each of the above equations represents cockpit displacement, cockpit velocity, or cockpit acceleration, it may be seen that if the mean or final velocity or displacement of the trainer is to be zero, that the time average of the right-hand sides of Equations 1, 2 and 3 must equal zero. This may be accomplished, for example, by positioning the trainer cockpit by means of a servo-mechanism which is driven by a transient first signal commensurate with a simulated aircraft quantity, by deriving a second signal commensurate with deviation or a function of deviation of the trainer from a desired mean position and applying the second signal to the servomechanism in opposition to the first signal to force displacement from the desired mean position to decrease.

The Laplace transformation of Equations 1, 2, and 3 may be written as:

$$\frac{X_s}{X_a} = \frac{p}{k_1 p + k_2} \qquad (4)$$

Where $p$ is the differential operator, and $k_1$ and $k_2$ are constants.

In practising the invention, a computed quantity from a conventional grounded trainer flight computer may be applied to any circuit having a transfer function such as $$\frac{p}{k_1 p + k_2}$$

to derive a voltage for positioning the cockpit. Those skilled in the art will readily perceive that there are numerous known circuits which may be utilized to provide such a transfer function. Furthermore, in many embodiments of the invention it is advantageous to vary the value of "$k_1$" in the transfer function in accordance with the cockpit displacement, or to schedule the value of $k_2$ according to such flight variables as dynamic pressure, Mach number or airspeed, as will be further explained below.

Figure 2:
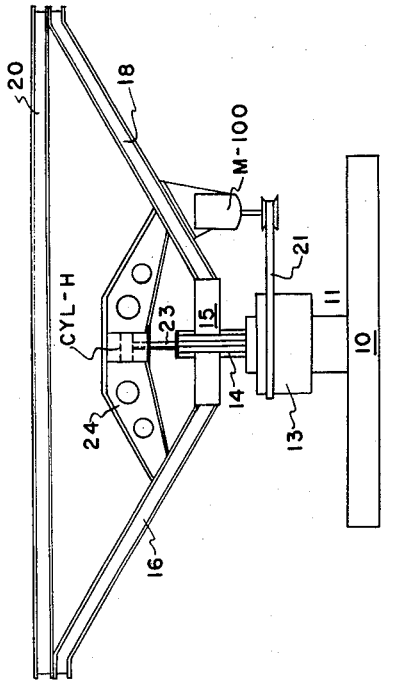
Figure 2 is a section view taken through the apparatus of Figure 1, showing exemplary apparatus for effecting limited rotation and translation of a trainer station in simulation of forces occuring in an actual aircraft during heading or altitude changes.

Referring to Figure 1 there is shown as an example, one of many mechanical arrangements which may be utilized in practising the invention. Since the precise mechanical arrangement is not part of my invention, it will be described only briefly. Rigidly attached to floor or base 10 and extending vertically therefrom is an upright column 11, having a pulley 13 fastened rigidly thereto. The upper end of column 11 contains a bearing (not shown) which carries an upper splined shaft 14. Splined shaft 14 is axially and rotatably mounted above column 11. Carried on splined shaft 14 is a hub 15 from which extend four supporting arms, 16, 17, 18 and 19. The four supporting arms extend outwardly and upwardly from hub 15 to carry main gimbal frame 20. For a better view of this portion of the invention reference may be had to Figure 2.

Mounted on supporting arm 18 is heading servo motor M-100, which is operatively connected to pulley 13 by means of belt 21. Since vertical column 11 is rigidly affixed to floor or base 10, and since upper splined shaft 14 is rotatably mounted in column 11, it will be seen that rotation of heading servo motor M-100 will serve to rotate hub 15 and main gimbal frame 20, in a horizontal plane. Hub 15 and main gimbal frame 20 are vertically positioned upon upper splined shaft 14 by means of connecting rod 23 and hydraulic cylinder CYL-H. Hydraulic cylinder CYL-H may be rigidly attached to the supporting arms by means of frame 24. As hydraulic fluid is admitted to and expelled from the upper and lower portions of hydraulic cylinder CYL-H, main gimbal frame 20 will be raised or lowered in simulation of changes in altitude.

Referring again to Figure 1, there is shown on one side of gimbal frame 20 a bearing housing 25 in which is rotatably disposed shaft 26. Mounted adjacent bearing housing 25 and geared to shaft 26 is pitching servo motor M-200. The external portion of shaft 26 is splined as shown and carries a cooperating splined hub of inner gimbal 28. On the opposite side of main gimbal 20, a similar hub of inner gimbal 28 is similarly journalled in main gimbal 20, except that sidewise translation of the piston of cylinder CYL-Y is provided to move gimbal 28 laterally within main gimbal 20. Thus it will be seen that rotation of pitching servo motor M-200 may serve to pitch inner gimbal 28 about the axis of shaft 26. Admission and expulsion of hydraulic fluid from the inner and outer chambers of cylinder CYL-Y will serve to translate inner gimbal 28 short distances within outer gimbal 20.

Situated at the forward end of inner gimbal 28 is a bearing housing 29 which carries splined shaft 31, which is rigidly attached to cockpit 35 of the trainer. The rear end of cockpit 35 is rotatably journalled in inner gimbal 28 by means of shaft 36, which carries hydraulic cylinder CYL-T. Bank servo motor M-300 is rigidly mounted on bearing housing 29 and is operatively geared to shaft 31, hence serving to rotate cockpit 35 about its rolling axis. Admission and expulsion of hydraulic fluid from hydraulic cylinder CYL-T serves to translate cockpit 35 longitudinally a short distance within inner gimbal 28.

Hence it may be seen that turning, pitching and banking of cockpit 35 will be provided by rotation of servomotors M-100, M-200 and M-300 and that translation of cockpit 35 may be provided by means of cylinders CYL-H, CYL-Y, and CYL-T. Electrical connections are made to each of the servomotors and to the cockpit by means of flexible cables (not shown), and hydraulic connections are made to each of the hydraulic cylinders by means of flexible conduits (not shown). The housing of each servo motor may contain a tachometer generator and a follow-up potentiometer, and follow-up potentiometers (not shown) may be mounted adjacent each hydraulic cylinder to measure displacement of the piston and connecting rod associated with each cylinder. Mechanical stops or electrical limit switches may be provided to prevent overtravel of each of the motive means.

It should be understood that while I have shown electric motors as means for providing limited rotational movement and hydraulic cylinders as means for providing limited translational movement, that these means may be interchanged (as by provision of rack and pinions, etc.). It should be further understood that while I have shown a specific mechanical arrangement whereby translation about or along three axes is accomplished, that in some embodiments of the invention it may be deemed feasible or desirable to eliminate rotation or translation about or along a particular axis or axes. The specific mechanical arrangement is exemplary only, and numerous other arrangements for providing limited cockpit rotation and translation will be readily apparent to those skilled in the art. The great number of electrical connections made to the cockpit from the trainer flight computers requires that cockpit motion be limited, and for ease in attaching cables between the computers and the cockpit it may be necessary to limit translational motion to no more than one or two feet, and for rotational motion to be limited to somewhat less than 360°.

By the use of flexible cables and slip rings, cockpit movements of such order may be realized, and it is to be understood that maximum possible movement is desirable for best simulation. The rotational movement of some aircraft may be substantially duplicated in magnitude.

Each of the servomechanisms may be arranged to balance with no signal input in a neutral mid-position so that the trainer cockpit is unbanked, unpitched, and faces a reference heading, with each hydraulic cylinder midway between the limits of its travel.

Referring to Fig. 3 there are shown in block form several systems which may be utilized in practising the invention. Each of the systems shown is a mechanization of one of the Equations 1, 2 or 3, and each has the transfer function mentioned above. In Figure 3a a potential commensurate with a simulated aircraft quantity $X_a$ (e.g. bank angle) is applied to a combining or summing means 1, the output of which is applied to a servomechanism 2 which functions to position the trainer cockpit 35. Servo mechanism 2 may comprise any of the equivalent servo systems providing a mechanical position output commensurate with the potential input. A feedback means 3 (e.g. a follow-up potentiometer) measures trainer cockpit deviation from a neutral or mid-position and applies a potential $X_s$ to conventional analogue computer integrator 4. The output from integrator 4 (commensurate with the quantity $k\int X_s dt$) is also applied to summing means 1, and hence the system may be seen to solve Equation 1. The output signal from integrator 4 which is applied to summing means 1 might be appropriately described as a wash out potential. If the invention is applied to a trainer bank or roll system, for example, the simulated aircraft bank or roll angle quantity may be derived, for example, in the manner shown in U.S. Patents Nos. 2,533,484 and 2,556,964. Almost all modern electrical flight trainers and simulators are equipped with bank angle servos or electronic integrators which provide potentials commensurate with simulated bank angle. Those skilled in the art will readily recognize that potentials or shaft positions proportional to bank angle, pitch angle, and angle of yaw and potentials proportional to the first and second time derivatives of those simulated flight quantities are either already available in conventional modern flight trainers or may be derived with ease in accordance with standard analog computer technique.

Figure 3B:
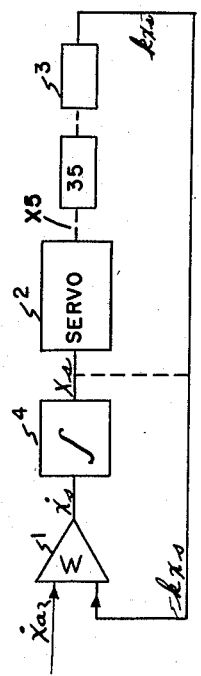
Figures 3a to 3e illustrate in block diagram form several computing and translating circuits which may be used in practising the invention.
Figure 3D:
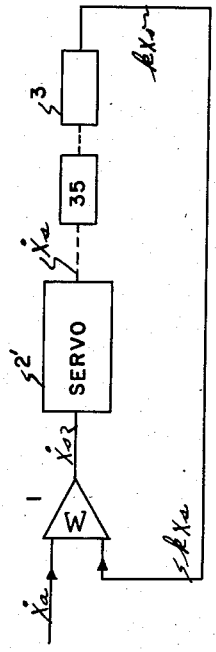
Figure 3E:
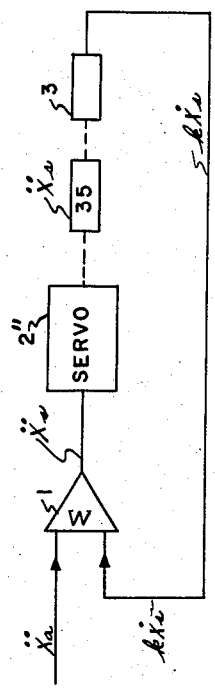
Figure 3A:
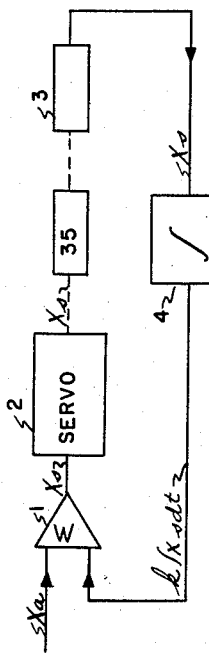
Figure 3C:
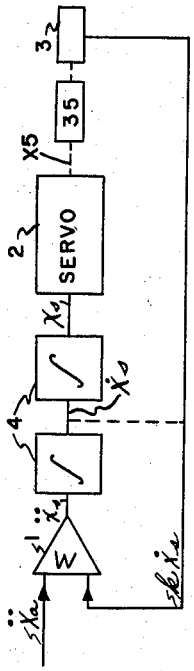

In Fig. 3b a potential commensurate with a simulated aircraft quantity $\dot{X}_a$ (e.g. rate of roll) is applied to a summing means 1 to be combined with a wash out potential $kX_s$ derived by the feedback means 3. These potentials combine to produce a quantity $\dot{X}_s$ as shown by Equation 2, and after being integrated by integrator 4, the $X_s$ output potential is available to position the trainer cockpit 35. In Figure 3c a potential commensurate with a simulated aircraft flight quantity $X_a$ (e.g. banking moment) is applied along with a displacement rate term (wash out) from the feedback element 3 to solve Equation 3. The feedback element 3 of Figure 3c may comprise, for example, a tachometer generator to measure rate of displacement of the trainer cockpit. In Figure 3b since a potential commensurate with $X_s$ exists at the output of the integrator 4, it may be considered desirable to derive the feedback from there rather than using feedback element 3. The dashed line in Figure 3b represents the alternative connection. Similarly, an $\dot{X}_s$ term in Figure 3c exists between the two integrators and the feedback quantity may be derived therefrom as illustrated by the dashed line of Figure 3c. It will be recognized here as elsewhere by those skilled in the art that the $k$ terms of each potential may be satisfied by appropriate resistance scaling using well-known analogue computer techniques.

It may be noted that in each of the systems described above that the trainer cockpit is positioned by a "position" voltage ($X_s$) even though the input flight quantity may be a term commensurate with a position, a velocity or a force. Since servomechanism positions or Miller integrator voltages are commonly present in conventional grounded trainers to express aircraft position, velocities, forces and moments in relation to an aircraft or air mass axis system, such servo positions or integrator voltages may be readily utilized for operating the systems of this invention. Since the trainer cockpit is positioned by a position voltage in each of the above described systems, the trainer cockpit position will follow simulated aircraft position as modified by the above stated transfer function. It is also within the scope of my invention to provide alternative systems wherein trainer cockpit velocities equal simulated aircraft velocities as modified by such a transfer function, or where forces and moments exerted on the trainer cockpit equal simulated aircraft forces and moments as modified by such a transfer function. In the system shown in Figure 3d, Equation 2 is solved to provide a velocity potential ($\dot{X}_s$) to drive the trainer cockpit at a simulated velocity, and in Figure 3e, Equation 3 is solved to provide an acceleration potential to exert particular forces upon the trainer cockpit. In Figure 3d a velocity or integrating servomechanism 2' is utilized to drive the trainer cockpit at a velocity $\dot{X}_s$. Servomechanism 2' may comprise any of the equivalent servo systems providing a mechanical velocity output commensurate with the potential input. The feedback means 3 shown measures the distance the cockpit is displaced and provides a wash out potential $kX_s$ commensurate therewith to be applied to the summing means 1. In Figure 3e, the servomechanism receives an input $\ddot{X}_s$ and applies a force to the trainer cockpit proportional to the acceleration quantity $\ddot{X}_s$. Servomechanism 2" may comprise any of the equivalent servo systems providing a mechanical force output to be applied to trainer cockpit 35 commensurate with the potential input. Since the trainer cockpit 35 is driven with an acceleration commensurate with $\ddot{X}_s$, its velocity is commensurate with $\dot{X}_s$ and its position is commensurate with $X_s$. The feedback means which may be exemplified by a tachometer 3 measures the rate of cockpit displacement to provide the $k\dot{X}_s$ term of Equation 3. A more detailed description of the equipment which may be utilized in constructing the systems shown will be given below.

Figure 4:
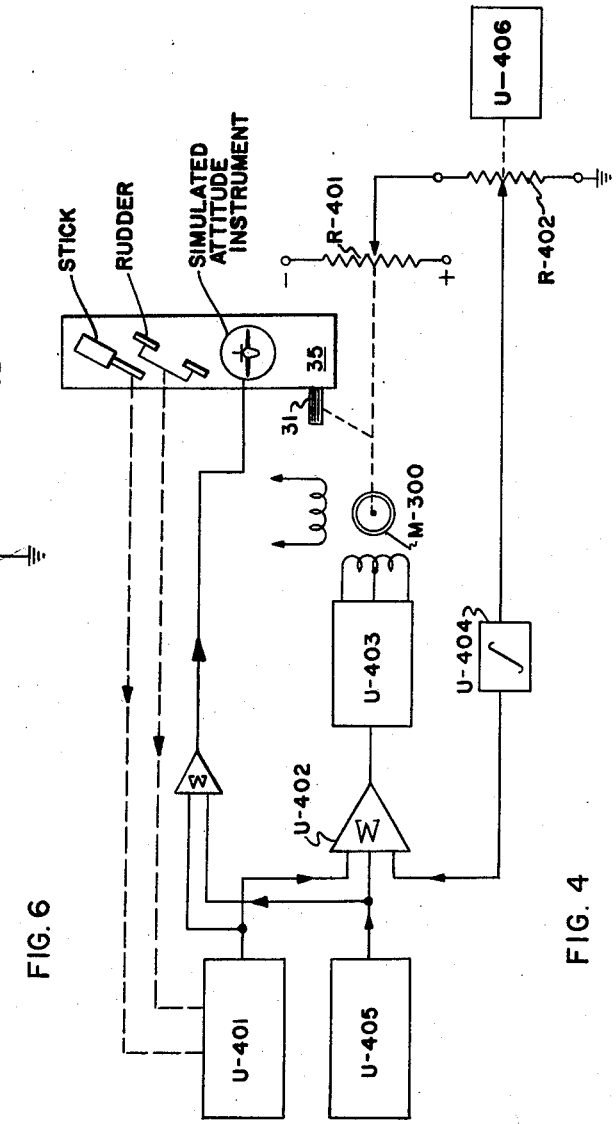
Figure 4 illustrates partially in block diagram schematic form a typical use of the invention in the banking or rolling system of a grounded aircraft trainer.

Referring to Figure 4 there is shown a schematic diagram of a typical banking system constructed according to the invention, in which certain parts are shown in block diagram form for sake of clarity. The system of Figure 4 is a particular species of the system shown in Figure 3a. A voltage commensurate with the bank angle of simulated flight is derived in U-401, the bank angle computer of a typical grounded trainer, and is applied to a conventional summing amplifier U-402. Servo amplifier U-403 and servomotor M-300 serve to position shaft 31 and hence to position cockpit 35 about its roll axis. A feedback element shown as comprising potentiometer R-401 measures the cockpit displacement from an unbanked position and applies a voltage commensurate therewith through potentiometer R-402 to integrator U-404. Assuming that the student manipulates the trainer flight controls so as to cause unbanked flight, no voltage signal will be applied from U-401, and the servomotor M-300 will have been driven so that cockpit 35 is in an unbanked position. If the student operates the controls so as to cause a sudden bank, a voltage from bank angle computer U-401 will unbalance the servo mechanism and cockpit 35 will also bank in a sudden manner. If a pilot then maintained the stick in a neutral position, the aircraft would continue to fly essentially in a banked condition. In the invention, if the student then centers the controls, the trainer cockpit will slowly be restored to its unbanked condition. The restoring or wash out potential is derived from feedback potentiometer R-401 and integrator U-404. As soon as the trainer cockpit is banked, a voltage ($X_s$) commensurate with the degree of bank is applied to integrator U-404. As the output voltage of integrator U-404 builds up, it repositions the trainer cockpit to its mid-position. It will be seen that since an input signal will be derived at all times except when cockpit 35 is in its mid-position (and the wiper of potentiometer R-401 is at the zero voltage point on the potentiometer winding), that an input signal will be applied to integrator U-404 until the output from the integrator has succeeded in actuating motor M-300 so as to restore the cockpit to its mid-position, at which time integrator input will be zero and integrator output will remain fixed. Since a pilot is more sensitive to the initial impulse of acceleration forces, the sudden initial deviation of the trainer cockpit from its mid-position will be readily noticed by the student, and the slow and gradual restoring force will not as readily be noticed, whereby the sensations of actual flight are realistically simulated. It is to be understood that even though the trainer cockpit is restored to mid-position by the "false" signal from integrator U-404, forcing the mean rotational displacement of the cockpit to be zero, that the attitude instrument in the trainer cockpit will be connected in its conventional manner (this is shown in Figure 4), so that it will indicated the correct simulated angle of bank. Provision is made in Fig. 4, by virtue of voltage source U-405, for impressing another voltage upon the system of Fig. 4 through summing amplifier U-402 which may be related to bank angle but not necessarily computed in bank angle computer U-401. Such a voltage may, for example, be commensurate with a function of the output of a rough air simulating voltage generator.

Since the nature of the mechanical arrangement prohibits unlimited motion of the trainer cockpit, it will become apparent that accurate simulation may not be effected under extreme conditions. Thus, if repeated sudden changes of aircraft bank angle in the same direction were attempted, so that cockpit 35 were moved to one of its allowable banking limits, further rapid changes in bank angle could not occur, and to this extent, accurate simulation would not be effected.

The relationship between actual aircraft motion and trainer cockpit motion is expressed by the transfer function stated above. It may be desirable in some embodiments of the invention to make the relationship non-linear such as by provision of a non-linear feedback potentiometer. In such a system, the trainer cockpit might follow closely the actual bank angle of the aircraft during small or medium changes in bank angle, but only rotate a fraction as far during a large change in bank angle. It will be apparent that the desirability of simulating large changes in bank angle will depend upon the maneuvering characteristics of the particular type of aircraft being simulated. Those skilled in the art may perceive that making the relationship non-linear is, in effect, replacing the term $$k_2 \int_0^t X_s dt$$

in Equation 1 with a term $$k \int_0^t f(X_s) dt$$

Since the sensitivity of the pilot to acceleration forces depends in part upon the instantaneous attitude of the aircraft, it may be desirable in some embodiments of the invention to make the relationship between aircraft motion and trainer cockpit motion a function of the instantaneous attitude of the aircraft. Those skilled in the art may perceive that this, in effect, amounts to replacing the term $k_1$ in the equations with a term $kf(X_a)$. If the bank angle computer in the above example of Figure 4 provides its output voltage from a servo-positioned potentiometer, such potentiometer may be provided with the desired function winding. If the computer provides its output from a Miller integrator, such integrator may be made non-linear, using known analogue computer techniques.

It may be seen that the rapidity with which the trainer cockpit is restored to its midposition after its transient displacement depends upon the time constant of the feedback loop circuit. If potentiometer R-402 is positioned near the top of its winding (as viewed in Figure 4), integrator U-404 will produce sufficient potential to reposition the cockpit much sooner than if R-402 applies only a small portion of the follow-up voltage to integrator U-404. Since the effect of acceleration forces varies with certain aircraft flight quantities such as Mach number, airspeed, dynamic pressure, etc., it becomes desirable to schedule the time constant of the circuit according to such variables. Thus, if the arm of potentiometer R-402 is automatically positioned in accordance with such a flight variable as shown in Figure 4 by the mechanical output of computer U-406 which may be a Mach number, or dynamic pressure, etc. computer, the dynamic behavior of the cockpit will more closely provide the sensations of actual flight. Those skilled in the art may perceive that variation of potentiometer R-402 amounts, in effect, to replacing the $k_2$ term of Equation 1 with a $f(M)$, $f(V)$ or $f(q)$ term, where M, V and q express Mach number, airspeed and dynamic pressure, respectively. The time constant of the particular integrator utilized in Figure 4 may be varied to cause the same operation.

Since each of the circuits of Figure 3 have the same transfer function, their operation will be similar and will consist of a movement similar to actual aircraft movement followed by a slow restoring movement. While I have shown the circuit of Fig. 3a as being used in a banking system in accordance with the description of Fig. 4, it will be apparent that the circuit of Fig. 3a is as well applicable to the other aircraft motions. In fact, any of the circuits of Figure 3 may be applied to any of the motions of the trainer, rotational or translational. It will also be apparent that while I have shown use of an electrical servomechanism and electrical analogue, computation, that hydraulic, pneumatic and other mechanical computation may be substituted using conventional analogue computer and instrumentation techniques.

Figure 6:
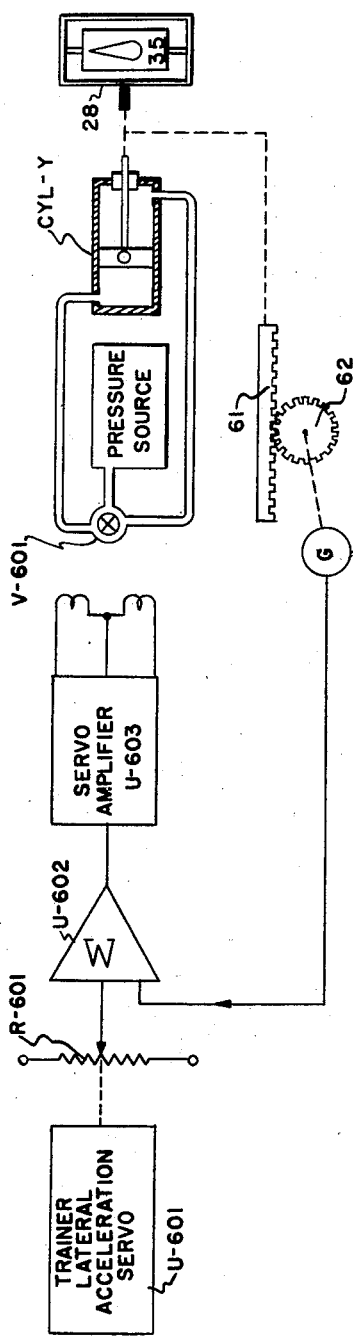
Figure 6 shows schematically and partially in block diagram form a typical use of the invention in simulation of lateral forces using hydraulic motive means.

Referring to Figure 6 there is shown schematically a lateral motion system constructed in accordance with the invention using the basic computing scheme of Figure 3e. A conventional grounded trainer lateral forces or lateral accelerations computer servo U-601 positions the arm of potentiometer R-601 in accordance with simulated aircraft lateral forces, applying a voltage commensurate therewith to summing amplifier U-602. Simulated lateral forces may be computed, for example, in the manner shown in U.S. Patent 2,591,752 or in accordance with the several other systems well-known in the art. The output voltage from the summing amplifier is fed to servo amplifier U-603, which amplifies the voltage sufficiently to operate servo valve V-601. The servo valve V-601 controls the pressure applied from the pressure source shown to the right and left chambers of hydraulic or pneumatic cylinder CYL-Y, the pressure being commensurate with the lateral forces on the aircraft as modified by the transfer function. The piston and connecting rod of cylinder CYL-Y apply a force to inner gimbal 28, hence applying a force to cockpit 35. Tachometer generator G is coupled to the motive means through rack 61 and pinion 62. The output voltage from tachometer generator G is proportional to the rate of displacement of the cockpit, and the voltage is applied to summing amplifier U-602. As mentioned above, the system solves Equation 3.

In Figures 3c and 3e rate or velocity terms are used as feedback. Since the maximum allowable rotation or translation of the cockpit is determined by the mechanical arrangement (position), cumulative errors or inaccuracies of the equipment of Figures 3c and 3e may cause the mid-position of the systems to drift. For this reason, the systems of Figures 3a, 3b and 3d are preferred, or, position measuring potentiometers (not shown) may be added to the systems of Figures 3c and 3e to force the systems to return to the actual mid-position. Provision of such a potentiometer to supply a small additional input to the summing means of Figures 3c or 3e would be, in effect, adding a term kXs to the right-hand side of Equation 3, and would also modify the transfer function to:

$$\frac{X_s}{X_a} = \frac{P^2}{k_1 P^2 + k_2 P + k_3}$$

Ordinarily, it is desirable that the added position signal be small in comparison to the existing signals, and it will be apparent that when the $k_3$ term of the above transfer function equals zero, that the transfer function reduces to the same as that recited in Equation 4.

In some embodiments of the invention it may be considered desirable not to provide single, independent motive means for each direction of cockpit motion, but instead to provide inter-related pairs or groups of motive means to move the cockpit in several directions. For example, rather than providing separate motive means for pitching and altitude change, it may be desirable to provide two inter-related motive means which co-act to produce the two motions. Assume that pistons are provided on the cockpit fore and aft center-line at the front and rear ends of the cockpit in a manner similar to that shown schematically in Figure 5. Simulated altitude change may be effected by movement of the pistons within cylinders 501 and 502 in equal amounts in the same direction. Simulated pitching may be effected by differential movement of the same pistons.

Assume that the student actuates the flight trainer controls so as to cause a decrease in altitude with no change in aircraft pitch angle. The conventional grounded trainer altitude servo will position the arm of potentiometer R-501 downwardly, supplying a negative transient voltage through capacitor C-501 and summing resistor R-511 to the input circuit of servoamplifier U-501. The negative transient voltage will also be applied from capacitor C-501 through summing resistor R-512 to the input circuit of servoamplifier U-502. The amplitude and duration of the negative transients will depend upon the rapidity and magnitude of the simulated loss of altitude. Summing resistors R-511 and R-512 may be of equal resistance, and hence equal negative signals will be applied to the two servoamplifiers. Each servoamplifier will operate its respective servovalve and cylinder, lowering the trainer cockpit an equal amount at each end. Feedback potentiometers R-513 and R-514 have their arms mechanically connected to the trainer cockpit so as to measure cockpit displacement and to apply feedback signals to servoamplifiers U-501 and U-502 proportional to instantaneous cockpit displacement. Hence both ends of the cockpit will be lowered equally an amount depending upon the simulated downward acceleration.

Now assume that the student actuates the trainer controls so as to cause a nose down pitching with no loss in altitude. The conventional grounded trainer pitch angle servo will drive the arms of potentiometers R-502 and R-503 downwardly as viewed in Figure 5, applying a positive transient to servoamplifier U-501 through capacitor C-502 and summing resistor R-506, and applying a negative transient to servoamplifier U-502 through capacitor C-503 and summing resistor R-507. Since equal and opposite transients are applied to the servoamplifiers, the cockpit will be pitched forward (nose-down) by the transients and then gradually restored as the voltages across the capacitors discharge to ground through resistors R-515 and R-516. If the student causes simulated changes in altitude and pitch angle simultaneously, the signals will be summed as will be apparent, and the cockpit will be positioned in accordance with pitch angle about a mean position determined by the instantaneous altitude. Other similarly related cockpit motions may be grouped according to the principles demonstrated. For example, turning and sidewise translation may be provided for by means of pistons or motors adapted to rotate the cockpit in a horizontal plane when acting differentially and to translate the cockpit sideways when acting in the same direction. Various other combinations will become apparent to those skilled in the art upon perusal of my disclosure. It will also be apparent that varying amounts of the capacitor voltage may be shunted to ground in accordance with airspeed, Mach number or dynamic pressure by servo-operated potentiometers to vary the circuit RC time constant and the transfer function in the same manner as described above.

Figure 5:
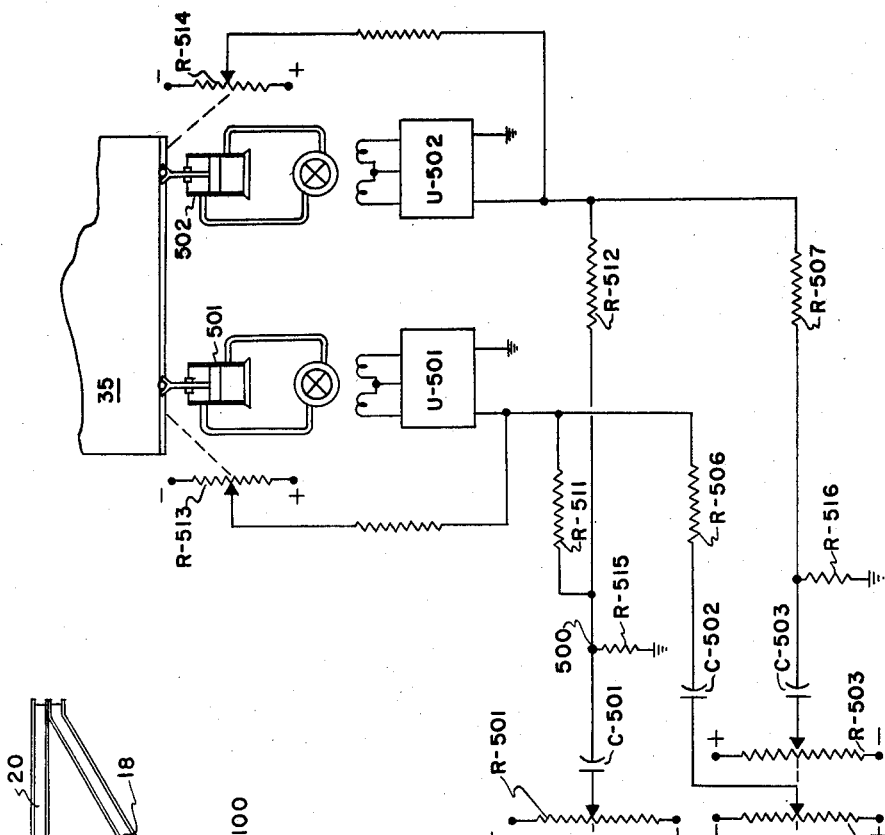
Figure 5 shows schematically partially in block diagram form an alternative embodiment of the invention in which the motions about more than one axis of the trainer are inter-related, using common motive means.

The system of Figure 5 illustrates a further system by which the same transfer function may be accomplished. If a voltage $X_a$ commensurate with a simulated aircraft quantity is applied to capacitor C-501 from the arm of potentiometer R-501, it may be seen that the voltages across capacitor C-501 and resistor R-515 are related as follows:

$$X_a = \frac{1}{C}\int_0^t i\, dt + iR$$

If the voltage across resistor R-515 is denominated $$X_a = \frac{1}{RC}\int_0^t X_s\, dt + X_s$$

Differentiating the above expression, $$\dot{X}_a = \frac{1}{RC} X_s + \dot{X}_s$$

Transposing terms and substituting P for the derivative notation, $$\frac{X_s}{X_a} = \frac{P}{P + \frac{1}{RC}}$$

Since R and C are constants, the transfer function is the same as Equation 4.

$$\frac{X_s}{X_a} = \frac{P}{P + k}$$

It may now be seen that the voltage existing at terminal 500 is proportional to the simulated aircraft quantity as modified by the transfer function, and hence is suitable for use in moving the trainer cockpit. It will now be further apparent that variation of the resistance of R-515 (eq. in accordance with Mach number) will vary the constant $k$ of the transfer function.

In summary the method described herein consists of applying perceptible motive impulses to the trainer cockpit in accordance with the motion of the simulated aircraft, and also applying a "false" or wash out signal to restore the cockpit slowly and relatively imperceptibly to a reference position to force the time average motion of the cockpit to be zero. While such a method serves to realistically simulate all motions of the aircraft about a means or steady-state position, no simulation of the effects of long term or steady-state accelerations is obtained. These steady state or long term accelerations may be simulated by altering the reference position of the cockpit. However, it should be obvious that when simulated flight conditions are such that long term or steady state acceleration are not of sufficient magnitude to be perceptible the time average motion of the cockpit should be zero in accordance with the teachings of the present invention.

Though I have shown and described several circuits which may be utilized for obtaining the desired transfer function, it is particularly to be understood that a very wide range of equivalent circuits may be utilized in practising the invention. Reference to chapter II of "Transients in Linear Systems," volume I, by Gardner and Barnes will aid those skilled in the art in utilizing additional circuits in practising the invention. It is also to be understood that while I have shown systems utilizing a particular linear transfer function, that those skilled in the art may use circuits having the same general transfer function embellished with constants or higher order $p$ terms without departing from the scope of the invention.

The transfer function $F(p)$ merely must be such that when multiplied by the transform of the input potential $X_a(p)$ and in turn multiplied by the operator $p$, it will approach zero as the limit as $p$ approaches zero is taken.

$$\lim_{p \longrightarrow 0} p[KX_a(p)F(p)] = 0$$

where F is the transfer function. The value of the function for a particular driving potential at infinite time may be expressed:

$$\lim_{t \longrightarrow \alpha} \text{output} = \lim_{p \longrightarrow 0} p[(\text{input transform})F(p)]$$

Those skilled in the art will recognize that the transfer function describes a "high-pass filter network," allowing only transients to pass. If steady-state quantities passed through the network, the system would not be restored to the mid-position. As otherwise expressed, the transfer function must be one which has a pole no higher than first order near the origin, as explained by theorem 14, page 265 of "Transients in Linear Systems" by Gardner and Barnes. Furthermore, although I have shown systems utilizing principally electrical analogue computing apparatus, those skilled in the art may substitute hydraulic, pneumatic and mechanical equivalents without departing from the invention. As well as the above cited publication, "Analysis and Design of Translator Chains," by H. Ziebolz, published by Askania Regulator Company, Chicago, Illinois (1946), will be useful to those skilled in the art in substituting equivalents in practising the invention.

It will thus be seen that the objects set forth above, among those made apparent from the preceding description, are efficiently attained. Since certain changes may be made in carrying out the above method and in the article set forth without departing from the scope of the invention, it is intended that all mater contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Grounded flight simulating apparatus comprising a student's station and means for deriving variable potentials commensurate with flight variables of a simulated aircraft, servo means responsive to circuit means having a transient function of at least one of said variable potentials for moving said station in an initial direction corresponding to the direction of movement of said simulated aircraft, said transient function having no steady-state terms, whereby whenever said station is displaced from a reference position in accordance with said simulated flight variables of said simulated aircraft, a restoring effect is developed tending to return said station toward said reference position.

2. Grounded simulating apparatus comprising a station and means for deriving a potential commensurate with motion of a vehicle, means connected to said deriving means and excited by said potential for deriving a transient potential having a time average magnitude of zero, and a servomechanism connected to be operated by said transient potential, said servomechanism being connected to move said station in an initial direction corresponding to that of said simulated aircraft, whereby whenever said station is displaced from a reference position in accordance with said simulated motion of said simulated vehicle, a restoring effect is developed tending to return said station toward said reference position.

3. Grounded simulating apparatus comprising a station and first means for deriving a potential commensurate with motion of a simulated vehicle in a reference direction, second means having a transfer function containing no steady-state terms connected to receive said potential and operable to produce a transient potential commensurate with motion of said vehicle as modified by said transfer function, motive means connected to be operated in accordance with said transient potential in an initial direction corresponding to motion of said simulated vehicle and means for varying the transfer function of said second means in accordance with a simulated variable of the type affecting the magnitude of motion of said simulated vehicle, whereby whenever said station is displaced from a reference position in accordance with said motion of said simulated vehicle, a restoring effect is developed tending to return said station toward said reference position.

4. Grounded aircraft training apparatus comprising a student's station and computer means operable to produce a first potential commensurate with a variable of motion of a simulated aircraft, first circuit means having a transfer function containing no steady-state terms for deriving a transient potential, second circuit means connected to receive said first potential and operable to modify said first potential as a function of said variable of motion to apply a driving potential to said first circuit means, and motive means connected to be operated by said transient potential from said first circuit means, said motive means being operable to move said station from a reference position in accordance with said driving potential as modified by said transfer function, whereby said station is moved initially in a direction corresponding to the direction of motion of said simulated aircraft to produce acceleration forces simulating those of actual flight and then a restoring effect is developed tending to return said station toward said reference position.

5. Grounded simulating apparatus comprising a station and means for deriving a potential commensurate with a simulated variable of motion of a simulated vehicle, high pass filter means connected to said potential for deriving a transient potential commensurate with said simulated variable of motion of said simulated vehicle as modified by the transfer function of said filter means, and motive means connected to receive said transient potential and to move said station in accordance with said instantaneous transient potential whereby whenever said station is displaced from a reference position in accordance with said simulated variable of motion of said simulated vehicle, a restoring effect is developed tending to return said station toward said reference position.

6. Grounded simulating apparatus comprising a station, means for deriving a potential commensurate with the simulated position of a simulated vehicle, and electric circuit means including a servomechanism connected to receive said potential, said circuit means having a transfer function containing no steady-state terms, and said servomechanism being connected to move said station in simulation of movement of said simulated vehicle as modified by said transfer function, whereby whenever said station is displaced from a reference position, a restoring effect is developed tending to return said station toward said reference position.

7. Grounded simulating apparatus comprising a station, plural motive means operably connected to move said station, means for deriving a plurality of potentials commensurate with motions of a simulated vehicle, plural transfer means each having a transfer function containing no steady-state terms for deriving a transient potential commensurate with a motion as modified by the transfer function of its associated transfer means, and circuit means for applying said transient potentials to said motive means, whereby whenever said station is moved from a reference position in accordance with said motions of said simulated vehicle, a restoring effect is developed tending to return said station toward said reference position.

8. Apparatus constructed according to claim 7 in which said motive means are mechanically connected to translate said station when actuated cumulatively and to rotate said station when actuated differentially.

9. Grounded aircraft training apparatus comprising a student's station, dummy controls operable to apply computer input quantities to a computer system, said computer system comprising means for solving the equations of motion of a simulated aircraft in accordance with the input quantities applied by movement of said controls to provide a first potential commensurate with simulated rotational motion of said simulated aircraft about an imaginary axis of said simulated aircraft, circuit means responsive to said first potential to provide a transient second potential having a time average magnitude of zero commensurate with said rotational motion as modified by the transfer function of said circuit means, the transfer function of said circuit means having no steady state terms, and motive means responsive to said second potential to rotate said student's station about an axis of said station substantially corresponding to said imaginary axis of said simulated aircraft, whereby whenever said station is displaced from a reference position in accordance with said simulated rotational motion of said simulated aircraft, a restoring effect is developed tending to return said station toward said reference position.

10. Apparatus according to claim 9 in which said first potential is commensurate with the angular position of said simulated aircraft about said imaginary axis.

11. Apparatus according to claim 10 in which said first potential is commensurate with simulated bank angle.

12. Apparatus according to claim 10 in which said first potential is commensurate with simulated pitch angle.

13. Apparatus according to claim 10 in which said first potential is commensurate with simulated angle of yaw.

14. Grounded aircraft training apparatus comprising a student's station, dummy controls operable to apply computer input quantities to a computer system, said computer system comprising means for solving the equations of motion of a simulated aircraft in accordance with the input quantities applied by movement of said controls to provide a first potential commensurate with simulated translational motion of said simulated aircraft along an imaginary axis of said simulated aircraft, circuit means responsive to said first potential to provide a transient second potential having a time average magnitude of zero commensurate with said translational motion as modified by the transfer function of said circuit means, the transfer function of said circuit means having no steady state terms, and motive means responsive to said second potential to translate said student's station along an axis of said station substantially corresponding to said imaginary axis of said simulated aircraft, whereby whenever said station is displaced from a reference position in accordance with said simulated translational motion of said simulated aircraft, a restoring effect is developed tending to return said station toward said reference position.

15. Grounded aircraft training apparatus comprising in combination means for deriving a first potential commensurate with position of a simulated aircraft with reference to an axis of said aircraft, circuit means applying said first potential to the input circuit of a summing device, servo means responsive to the output from said summing device and operable to move a simulated student's station with reference to a corresponding axis, means responsive to movement of said station with reference to said corresponding axis to provide a displacement signal, integrating means responsive to said displacement signal to provide an output potential which is the time integral of said displacement signal, and circuit means applying said output potential from said integrating means to the input circuit of said summing device, whereby whenever said station is displaced from a reference position relative to said axis of said simulated aircraft, a restoring effect is developed tending to return said station toward said reference position.

16. Grounded aircraft training apparatus comprising in combination means for deriving a first potential commensurate with velocity of a simulated aircraft with reference to an axis of said aircraft, circuit means applying said first potential to the input circuit of a summing device, integrating means responsive to the output of said summing device, and operable to provide a second potential commensurate with the time integral of the output of said summing device, servo means responsive to said second potential and operable to move a simulated student's station with reference to a corresponding axis, means responsive to movement of said station to provide a displacement signal commensurate with displacement of said station from a reference position, and circuit means applying said displacement signal to the input circuit of said summing device, whereby whenever said station is displaced from a reference position relative to said axis of said simulated aircraft in accordance with said velocity, a restoring effect is developed tending to return said station toward said reference position.

17. Grounded aircraft training apparatus comprising in combination means for deriving a first potential commensurate with velocity of a simulated aircraft with reference to an axis of said aircraft, circuit means applying said first potential to the input circuit of a summing device, integrating servo means responsive to the output potential of said summing device for moving a simulated student's station with reference to a corresponding axis at a velocity proportional to said output potential of said suming device, means responsive to displacement of said station with respect to said corresponding axis to provide a displacement signal, and circuit means applying said displacement signal to the input circuit of said summing device, whereby whenever said station is displaced from a reference position relative to said axis of said simulated aircraft in accordance with said velocity, a restoring effect is developed tending to return said station toward said reference position.

18. Grounded aircraft training apparatus comprising in combination means for deriving a first potential commensurate with acceleration of a simulated aircraft with reference to an axis of said aircraft, circuit means applying said first potential to the input circuit of a summing device, a force servo means connected to receive the output from said summing device for accelerating a student's station with reference to a corresponding axis at a rate of change of velocity proportional to the output from said summing device, means responsive to movement of said station to provide a feedback signal commensurate with velocity of said station with reference to said corresponding axis, and circuit means applying said feedback signal to the input circuit of said summing device, whereby whenever said station is displaced from a reference position relative to said axis of said simulated aircraft in accordance with said acceleration, a restoring effect is developed tending to return said station toward said reference position.

19. Grounded aircraft trainer including a simulated indicator simulating an aircraft indicator of the type actuated by aircraft motion, first means for initially displacing said trainer from a reference position and for concomitantly actuating said simulated indicator to indicate said displacement, and second means for restoring said trainer to its reference position after said initial displacement, said simulated indicator being arranged to operate independently of said second means, whereby said second means performs its restoring function without affecting the indication of said indicator in any way.

References Cited in the file of this patent

UNITED STATES PATENTS

| | | |
|---|---|---|
| 2,234,326 | Tiebel | Mar. 11, 1941 |
| 2,485,266 | Edinburg | Oct. 18, 1949 |
| 2,510,500 | Hayes et al. | June 6, 1950 |
| 2,510,579 | Kail | June 6, 1950 |
| 2,620,463 | Meredith | Dec. 2, 1952 |
| 2,622,231 | Gray | Dec. 16, 1952 |
| 2,687,580 | Dehmel | Aug. 31, 1954 |
| 2,712,184 | Ziebolz et al. | July 5, 1955 |

OTHER REFERENCES

Pickens: Electronic Analog Computer Fundamentals, Electronics, August 1952, pages 144 to 147.

Wood, Jr.: The Modern Flight Simulator, Electrical Engineering, December 1952, pages 1124 to 1129.

Servomechanism Analysis, by Thaler and Brown; pp. 93, 104, and 209; McGraw-Hill Book Co., 1953.